United States Patent
Siddall et al.

[15] 3,661,120  
[45] May 9, 1972

[54] MILKING INFLATIONS

[72] Inventors: Don F. Siddall, Akron; Vincent L. Hoffman, Summit, both of Ohio

[73] Assignee: The Norton Company, Worcester, Mass.

[22] Filed: Feb. 6, 1970

[21] Appl. No.: 9,197

[52] U.S. Cl. ....................................................... 119/14.49
[51] Int. Cl. .............................................................. A01j 5/04
[58] Field of Search ................................... 119/14.47–14.53

[56] References Cited

UNITED STATES PATENTS

| | | | |
|---|---|---|---|
| 2,997,980 | 8/1961 | Noorlander | 119/14.52 |
| 3,308,788 | 3/1967 | Noorlander | 119/14.52 |
| 3,474,760 | 10/1969 | Siddall et al. | 119/14.49 |
| 3,289,634 | 12/1966 | Simons | 119/14.52 |

*Primary Examiner*—Aldrich F. Medbery  
*Attorney*—Meyer, Tilberry and Body

[57] ABSTRACT

An improvement in milking inflations having a teat-receiving collar wherein the inner periphery of the collar is of generally uniform thickness and when projected onto a plane passed through the center of the inner periphery and perpendicularly to the major axis of the body portion of the inflation has a generally circular configuration with a perimeter of finite length. The inner periphery of the collar is formed of a series of contiguous wave forms representing periodic oscillations above and below the aforementioned plane, the true length of the inner periphery, along the wave forms, exceeding the finite length of the projected perimeter by a given distance, half of the true length falling above and half falling below said plane.

4 Claims, 3 Drawing Figures

PATENTED MAY 9 1972 3,661,120

INVENTORS
DON F. SIDDALL
VINCENT L. HOFFMAN
BY Meyer, Tilberry & Body
ATTORNEYS

MILKING INFLATIONS

This invention relates to the art of automatic milking equipment and more particularly to an improvement in milking inflations.

Milking inflations of the type improved by this invention are of conventional design, and comprise an elongated, tubular body portion, a generally cylindrical cuff portion merged with one end of the body portion, and a teat-receiving collar extending inwardly from generally the point of merger of the body and cuff portions.

For many years virtually all milking inflations were made of natural of synthetic rubber. More recently, milking inflations made of elastomeric vinyl plastics have made substantial inroads in the market place.

Rubber-inflations suffer the disadvantages of being difficult to clean and sanitize and even more difficult to inspect for cleanliness. Due to the fact that rubber is relatively porous, it absorbs butterfat from the milk. Butterfat causes the rubber to swell, enlarging the pores. After each use the rubber inflation must be cleaned in a caustic solution to dissolve out the absorbed butterfat. This leaves empty pores in a state of enlargement, and the surface of the rubber in a weakened structural condition. Constant flexing of the rubber during the milking operation, particularly in the area of teat-enrobing collar, causes the development of stress cracks as the pores begin to communicate with each other due to a flexural failure of the walls separating the pores. Oxidation of the rubber also contributes to the development of stress cracks.

Since rubber is opaque, it is difficult to detect hairline cracks when they develop. This results in rubber inflations being used which are incompletely sanitized, and may also lead to a structural failure of a rubber inflation while in use.

The advent of elastomeric vinyl milking inflations went a long way towards solving the problems associated with rubber inflations. First, vinyl inflations could be made transparent, making it much easier to spot cracks as they developed. Further, vinyl plastics are less porous than rubber, substantially reducing the amount of butterfat absorbed by the plastic. As a result, vinyl inflations could be cleansed with less concentrated caustic solutions than were needed to cleanse the rubber inflations. As a matter of fact, vinyl plastic degrades somewhat when exposed to caustic solutions, so that the use of dilute caustic is important in terms of the longevity of the vinyl inflation. Unfortunately, many farmers feel that their vinyl inflations will not be entirely cleansed unless they use the same high concentration caustic solutions that they had been using for many years in connection with rubber inflations. This accelerates the degradation of the vinyl plastic. As with rubber inflations, cracks develop as a consequence of the continued flexing of the inflation during use, particularly in the area of the teat-enrobing collar.

In recognition of the fact that both rubber and vinyl inflations develop stress cracks first in the vicinity of the teat-enrobing collar, a new collar design has been created which is far more resistant to cracking than any design known to the prior art. The novel design provides a collar periphery which has a substantially uniform thickness and is free of sharp corners or other stress concentrating features. Thus the flexural forces acting upon the periphery of the collar are distributed substantially uniformly along the collar.

More specifically, in accordance with the present invention, there is provided a milking inflation comprising an elongated, tubular body portion, a generally cylindrical cuff portion merged with one end of the body portion, and a teat-receiving collar extending inwardly from generally the point of merger of the body and cuff portions, and extending conically upwardly beyond the end of the body portion when the cuff portion is folded down over the body portion. The inner periphery of the collar is of generally uniform thickness and when projected in a plane perpendicular to the major axis of the body portion of the inflation, it has a generally circular configuration with a perimeter of finite length. The inner periphery of the collar is formed of a series of contiguous wave forms representing periodic oscillations above and below the plane perpendicular to the major axis of the body portion of the milking inflation and passing through the center of the inner periphery. The true length of the inner periphery of the collar along the wave forms exceeds the finite length of the projected perimeter by a given distance half of the true length along the inner periphery falling above and half falling below said plane.

It is, therefore, an object of the invention to provide an improved milking inflation.

A further object of the invention is to provide a milking inflation which has greater resistance to stress cracking particularly in the area of the teat-enrobing collar portion.

Still another object of the invention is to provide a milking inflation having a collar portion of generally uniform thickness and free of sharp corners and other stress concentrating features.

Yet another object of the invention is the provision of milking inflation made of either rubber of vinyl plastic having a collar portion, the inner periphery of which is formed of contiguous wave forms representing periodic oscillations.

These and other objects and advantages will become apparent from the following detailed description of a preferred embodiment of the invention when read in conjunction with the accompanying drawings, in which.

Figure 1:
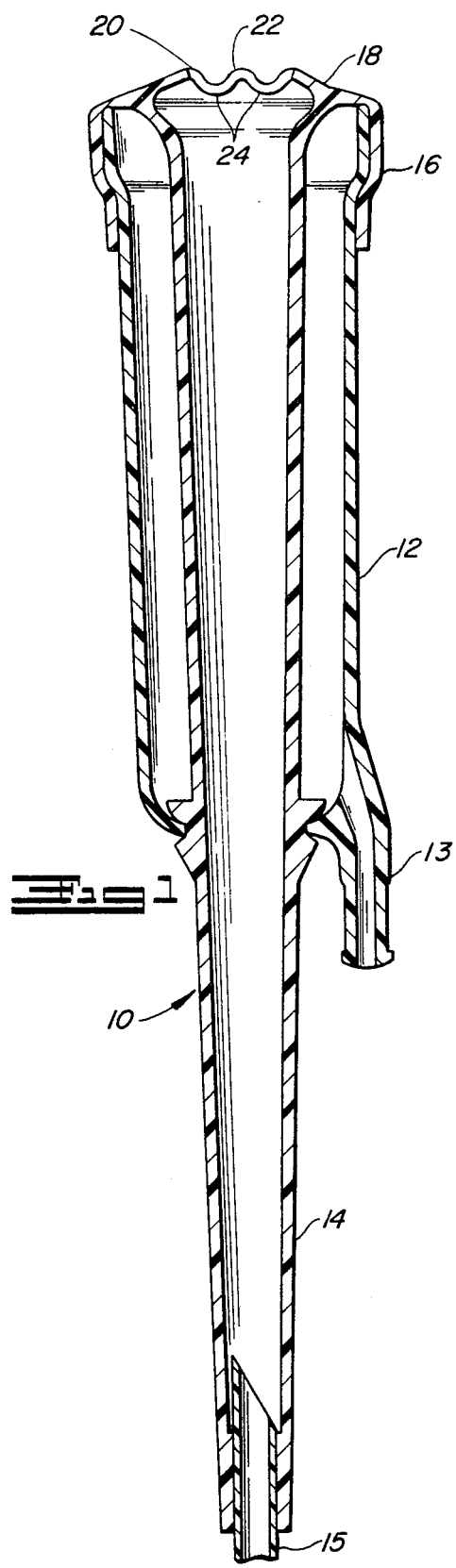
FIG. 1 is a schematic section view of a milking inflation assembly comprising the improved milking inflation of the present invention.

Referring now to the drawings wherein the showings are for purposes of illustrating a preferred embodiment of the invention only, and not for the purpose of limiting the same, FIG. 1 shows a milking inflation assembly comprising a milking inflation designated generally as 10, and rigid shell 12. The shell may be formed from a variety of materials such as metal or glass, but in the preferred embodiment illustrated it is formed of a synthetic plastic material such as an acrylic resin e.g. methyl methacrylate, a polycarbonate, a polyphenylene, methylpentene, a polysulfone, a rigid vinyl, etc., and is preferably transparent.

Shell 12 is provided with tube 13 which is connected to a source of pulsating vacuum forming no part of the present invention and, therefore, not illustrated.

Milking inflation 10 comprises tubular body portion 14 the lower open end of which connects to a "claw" shown fragmentarily at 15, which collects milk from a plurality of milking inflations.

The upper end of tubular body portion 14 merges with cylindrical cuff portion 16 and teat-receiving collar 18 extends inwardly from generally the point of merger of body portion 14 and cuff portion 16.

With cuff portion 16 folded down over body portion 14 and around the upper end of shell 12 as illustrated in FIG. 1, collar 18 extends conically upwardly beyond the end of body portion 14.

Figure 2:
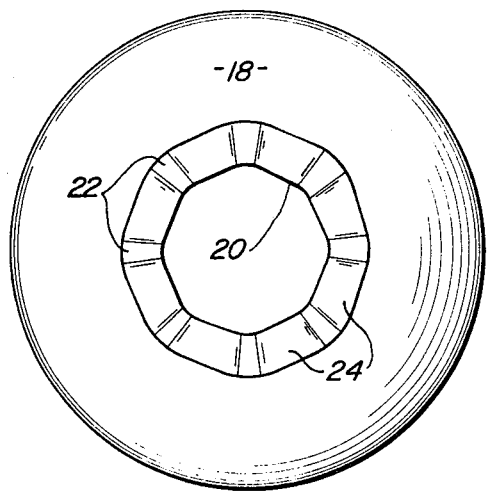
FIG. 2 is a schematic plan view of the collar portion of the milking inflation illustrated in FIG. 1, when in its relaxed position.

The inner periphery of collar 18, designated generally at 20 is substantially of uniform thickness throughout. When projected in a plane perpendicular to the major axis of body portion 14, periphery 20 has a generally circular configuration with a perimeter of finite length, as best seen in FIG. 2. This figure shows collar 18 in its relaxed position.

Referring again to FIG. 1 it will be seen that inner periphery 20 of collar 18 is formed of a series of contiguous wave forms 22, 24 representing periodic oscillations above (22) and below (24) a plane perpendicular to the major axis of body portion 14 and passing through the center of the inner periphery 20. The true length of inner periphery 20, along wave forms 22, 24 exceeds the finite length of the aforesaid projected perimeter by a given distance, the true length falling half above and half below the aforesaid perpendicular plane.

Figure 3:
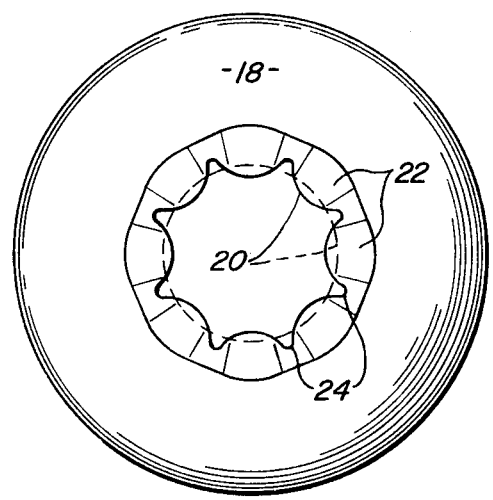
FIG. 3 is a schematic plan view similar to FIG. 2 but showing the collar portion of the inflation in its flexed position.

FIG. 3 shows teat-receiving collar 18 in its flexed position. This configuration occurs when vacuum is pulled on the chamber formed between shell 12 and section of tubular body portion 14 it encases. When collar 18 is flexed downwardly toward a plane perpendicular to the major axis of the body portion of the inflation, wave oscillations 22 are drawn inwardly of the inner periphery of the collar, which is shown in dotted lines in the upward, relaxed position. Inner periphery 20 is also shown in FIG. 3 as a solid line in the downward, flexed position. This provides interrupted contact with the teat toward the end of the vacuum stroke, breaking the vacuum seal and thus preventing the milking inflation from "riding up" on the teat during the milking operation.

In the preferred embodiment illustrated the wave forms representing periodic oscillations have the same amplitude and frequency. Some variation is permitted, however, so long as the amount by which the true length of the inner periphery of the collar along the wave forms exceeds the finite length of the projected inner perimeter of the collar, falls half above and half below the plane perpendicular to the major axis of the body portion of the milking inflation.

By the present invention there is provided an improved milking inflation which is less susceptible to stress cracking caused by flexure in use and accelerated by repeated exposure of the inflation to butterfat and caustic. This has been accomplished by providing the milking inflation with a collar portion which is of uniform thickness, free of sharp corners and otherwise devoid of stress concentrating features. Further, the collar is provided with an inner periphery which has a true length exceeding by a substantial margin the projected length of the inner perimeter of the collar. This provides the inner periphery of the collar with reserve length so that it can respond to expansion and contraction forces readily without developing points of high stress concentration.

The present invention has been described in conjunction with certain structural embodiments; however, it is to be appreciated that various structural changes may be made in the illustrated embodiments without departing from the intended scope and spirit of the present invention.

Having thus described our invention we claim:

1. A milking inflation comprising an elongated, tubular body portion, a generally cylindrical cuff portion merged with one end of said body portion and a teat-receiving collar extending inwardly from generally the point of merger of said body and cuff portions, and extending conically upwardly beyond the end of said body portion when said cuff portion is folded down over the former, the inner periphery of said collar (a) being of generally uniform thickness, (b) having a generally circular configuration, and (c) being formed of a series of contiguous wave forms representing periodic oscillations above and below a plane passed through the center of said inner periphery perpendicularly to the major axis of said body portion, and the true length of said inner periphery along said wave forms exceeding the length of said periphery projected onto said plane, said true length lying half above and half below said plane.

2. The milking inflation as defined in claim 1 wherein all of said periodic oscillations have the same amplitude.

3. The milking inflation as defined in clam 2 wherein all of said periodic oscillations have the same frequency.

4. The milking inflation as defined in claim 1 wherein the wave forms representing periodic oscillations above said plane extend inwardly of the inner periphery of said collar when the collar is flexed downwardly toward a plane perpendicular to the major axis of the body portion of said milking inflation.

* * * * *